July 5, 1938.  J. F. McLEER  2,122,888
ELECTRICAL DRILL OR HAMMER
Original Filed Oct. 3, 1934
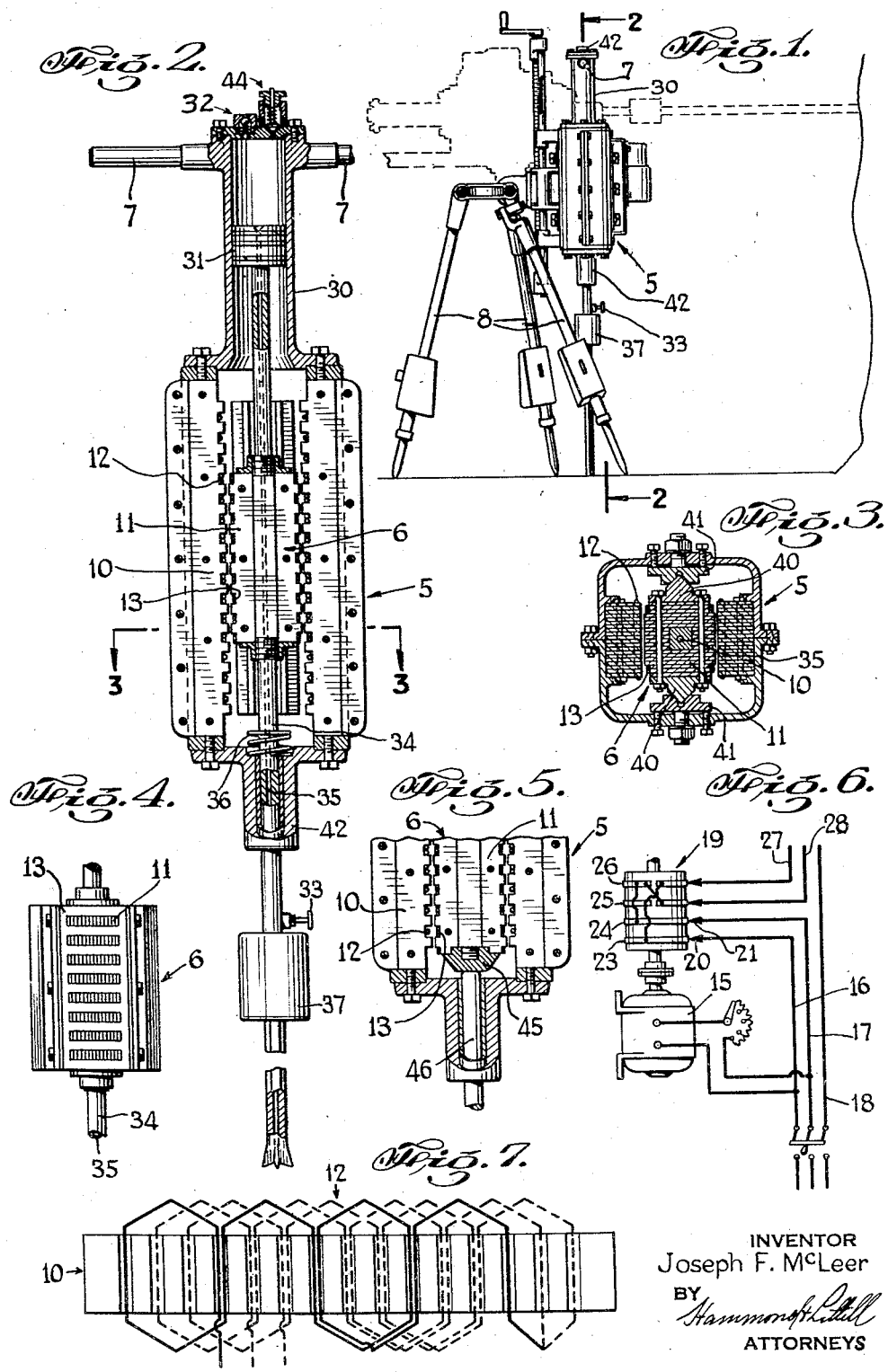
INVENTOR
Joseph F. McLeer
BY
Hammond & Littell
ATTORNEYS Patented July 5, 1938

2,122,888

UNITED STATES PATENT OFFICE 2,122,888

ELECTRICAL DRILL OR HAMMER

Joseph F. McLeer, Brooklyn, N. Y.

Application October 3, 1934, Serial No. 746,699
Renewed April 16, 1938

5 Claims. (Cl. 172—249)

The present invention relates to machine tools of the type comprising a relatively stationary but usually portable member and a reciprocatory member which may carry, for example, a chuck for the connection of a drill or other tool and has for an object to provide an improved tool of this general type which may be operated from readily available electrical power.

The invention has been developed more particularly in connection with the design of drilling machines for drilling holes either a few feet or several hundred feet into rock, and for the purposes of disclosure of the principles of the invention such an embodiment will be more particularly described.

In the accompanying drawing—

Figure 1 is a view in side elevation of a rock drill embodying certain principles of the invention, Fig. 2 is a vertical central sectional view of the drill, Fig. 3 is a transverse sectional view taken on the line 3—3 of Fig. 2, Fig. 4 is a detail view showing the construction of the secondary element, Fig. 5 is a view of another embodiment showing a hammer construction, Fig. 6 is a view showing a motor and switch for controlling the three-phase current supplied to the tool, and Fig. 7 is a detail view indicating the winding of the primary of the electrical motor.

The drilling machine illustrated comprises a relatively stationary element 5 of a size and weight to be readily portable and a reciprocatory element 6 movable longitudinally therein. The stationary element comprises a casing having handles 7 supported by a tripod 8 to which the casing is adjustably connected. The reciprocatory element is arranged to be operated by an electric current, in the structure illustrated, a three phase current.

The electric motor for actuating the reciprocating member is similar in principle to an ordinary induction motor and comprises the primary elements 10 and secondary elements 11, the primary and secondary elements, however, being straight instead of circular, that is to say they are in effect developments of the primary and secondary elements of a three phase motor. Both primary and secondary elements comprise laminated iron cores slotted to receive the primary windings 12 and the secondary closed circuit windings or squirrel cage grids 13.

The direction of movement of the reciprocating element is reversed by a constantly actuated reversing switch controlling two of the three electric circuits of the three phase circuit. This arrangement is best shown in Fig. 6 wherein a small motor 15 is constantly driven from two of the three conductors 16, 17, 18 and a rotatable switch 19 is connected to said motor.

The switch is interposed in the three phase current supply circuit to alternate the connection to two of the conductors. As shown, brushes 20 and 21 connected to the current feed lines 16 and 17 engage continuous slip rings 23 and 24. These rings in turn are connected to split rings 25 and 26, the sections of which are cross connected as indicated in the drawing to provide an alternation of connection between the mains 16 and 17 and the leads 27 and 28 of the reciprocating motor. The feed line 18 is directly connected to the motor, the current in this lead not being changed by the switch. By this arrangement the period of reciprocation of the reciprocating motor will be determined by the speed of the control motor and this may be adjusted in any known or suitable manner if adjustment is desired. In some instances it is convenient and satisfactory to provide different armature windings in the motor in order to provide a limited number of desired speed changes or to provide a variable resistance in the motor circuit or a variable speed connection between the motor and switch.

Means is preferably provided for cushioning the upward or inoperative movement of the reciprocating member and returning the stored energy of such cushioning to the member to increase its downward or operative movement. As shown this is accomplished by providing the cylinder 30 in which a piston 31 connected to the reciprocating member operates. A check valve 32 is provided in the top of the cylinder to admit air as indicated in Fig. 2, and a second valve is provided for insuring a predetermined compression in the cylinder. This valve may be a simple hand valve as indicated at 33 or it may be a valve arranged to close at a predetermined part of the stroke. Furthermore, a relief valve or safety valve may be provided in the cylinder to prevent too great a pressure in the cylinder.

The piston and cylinder also constitute means for providing compressed air and the axial rod 34 of the reciprocating member is centrally drilled to provide an air conduit 35 through which compressed air may be led to the point of the drill for blowing away chips in operation. At the lower end of the casing a cushioning spring 36 is provided for cushioning the movement of the reciprocating member when the drilling machine is lifted or when for other reasons its downward movement is not sufficiently stopped by the operative stroke. At the lower end of the reciprocating member a drill chuck 37 is provided. This chuck may be of any suitable type such, for example, as a drill rotating chuck or other desired type.

The reciprocating member is provided with guides 40 which operate in guideways 41 in the side walls of the casing thereby cooperating with the rod 34 guided by a bearing 42 in the lower end of the casing and by the cylinder 30 above.

It will be understood that while the drill is more commonly used in the vertical position shown in Fig. 2 it may also be used in horizontal position as indicated in dotted lines in Fig. 1 or in inverted or inclined position. When used in horizontal, inclined, or inverted position it may be desired to increase the pressure in the cylinder 30 and for this purpose the valve 33 may be partially or entirely closed. An adjustable relief valve 44 provides for varying the limit of compression.

In Fig. 5 is shown another embodiment of the invention better adapted for work where it is desired to use a hammer action. In this structure the reciprocating member is formed with a hammer head 45 and a drill or other suitable tool 46 is inserted in cooperative position. Any of the usual tools and any of the usual chucks or other connecting devices may be associated with the tool shown.

It will be understood that the foregoing particular description is illustrated merely and is not intended as defining the limits of the invention. The construction obviously may be modified in accordance with the requirements of use, such as the weight of the drill parts and other features incident to the particular use.

I claim:—

1. A machine tool comprising a relatively stationary casing, a reciprocatory member guided for movement in said casing and means to reciprocate the latter comprising a poly-phase reciprocatory motor having a primary element carried by the casing and consisting of a slotted core member extending parallel to the line of movement of the reciprocatory member positioned at one side of and with its slots facing said reciprocatory member and coils in said slots with their axes at right angles to the direction of movement of the reciprocating element, and a secondary element carried by the reciprocatory member comprising a slotted core member extending longitudinally of the reciprocatory member with its slots facing the primary element and a squirrel cage grid member positioned in said slots and means for periodically changing the current in the primary element to cause reciprocatory movement of the secondary element.

2. A machine tool comprising a relatively stationary casing, a reciprocatory member guided for movement in said casing and means to reciprocate the latter comprising a three phase reciprocatory motor having primary and secondary elements carried by the casing and reciprocatory member in cooperative relation, the primary elements being positioned on opposite sides of the reciprocatory member and having coils arranged progressively in three phase relation with their axes at right angles to the direction of movement of the reciprocatory member and means for periodically changing the electrical connections to reverse the movement of the reciprocatory member.

3. A machine tool comprising a relatively stationary casing, a reciprocatory member guided for movement in said casing and means to reciprocate the latter comprising a three phase reciprocatory motor having primary and secondary elements carried by the casing and reciprocatory member in cooperative relation, said elements each comprising a slotted laminated core with coils positioned in the slots, the coils of the primary and secondary elements lying in parallel planes facing each other and means for periodically reversing the electrical connections to reverse the direction of movement, substantially as described.

4. A machine tool, as defined in claim 1, wherein the coils of the primary element are arranged to overlap each other, substantially as shown and described.

5. A machine tool, as defined in claim 2, wherein the coils of the primary elements are arranged to overlap each other, substantially as shown and described.

JOSEPH F. McLEER.